United States Patent
Slovencik

(10) Patent No.: US 8,146,332 B2
(45) Date of Patent: Apr. 3, 2012

(54) COMPOSITE AIR AND FOAM PROTECTIVE PACKAGING

(75) Inventor: Jean-Marc Slovencik, Uhrwiller (FR)

(73) Assignee: Storopack, Inc., Cincinnati, OH (US)

( * ) Notice: Subject to any disclaimer, the term of this patent is extended or adjusted under 35 U.S.C. 154(b) by 0 days.

(21) Appl. No.: 13/106,101

(22) Filed: May 12, 2011

(65) Prior Publication Data

US 2011/0212212 A1    Sep. 1, 2011

Related U.S. Application Data

(62) Division of application No. 12/546,098, filed on Aug. 24, 2009.

(60) Provisional application No. 61/091,547, filed on Aug. 25, 2008.

(51) Int. Cl.
*B65B 9/02* (2006.01)

(52) U.S. Cl. .................... 53/553; 53/79; 53/97; 53/170; 53/545; 53/554; 53/562; 53/574; 493/217; 493/379

(58) Field of Classification Search ............... 53/79, 97, 53/170, 545, 554, 555, 558, 562, 568, 574, 53/450–452, 455, 456; 493/193, 210, 217, 493/374, 379
See application file for complete search history.

(56) References Cited

U.S. PATENT DOCUMENTS

| | | | |
|---|---|---|---|
| 3,460,740 A | 8/1969 | Hagen | |
| 3,949,879 A | 4/1976 | Peterson et al. | |
| 4,674,268 A * | 6/1987 | Gavronsky et al. | 53/468 |
| 4,856,655 A * | 8/1989 | Barsky | 206/524 |
| 5,027,583 A | 7/1991 | Chelak | |
| 5,129,519 A * | 7/1992 | David et al. | 206/523 |
| 5,447,235 A * | 9/1995 | Pharo | 206/522 |
| 5,676,509 A | 10/1997 | Enzu | |
| 5,727,370 A | 3/1998 | Sperry | |
| 6,178,725 B1 * | 1/2001 | Sperry et al. | 53/451 |
| 6,386,850 B1 * | 5/2002 | Salerno et al. | 425/112 |
| 7,497,066 B2 * | 3/2009 | Calogero | 53/403 |

FOREIGN PATENT DOCUMENTS

WO    2006058172    1/2006

OTHER PUBLICATIONS

PCT/US2009/054873 Notification of Transmittal of the International Search Report and the Written Opinion of the International Searching Authority, Feb. 15, 2010, 12 pages.
U.S. Appl. No. 12/724,136, filed Mar. 15, 2010, entitled Method and Machine for Making Foam Cushions.

* cited by examiner

*Primary Examiner* — Christopher Harmon
(74) *Attorney, Agent, or Firm* — Wood, Herron & Evans, LLP

(57) ABSTRACT

A composite air and foam protective packaging product comprises a packaging cushion having, in cross-section, at least three plies of plastic film, foam between a first ply and a second ply of the three plies of plastic film, and air between the second ply and a third ply of the three plies of plastic film.

11 Claims, 3 Drawing Sheets

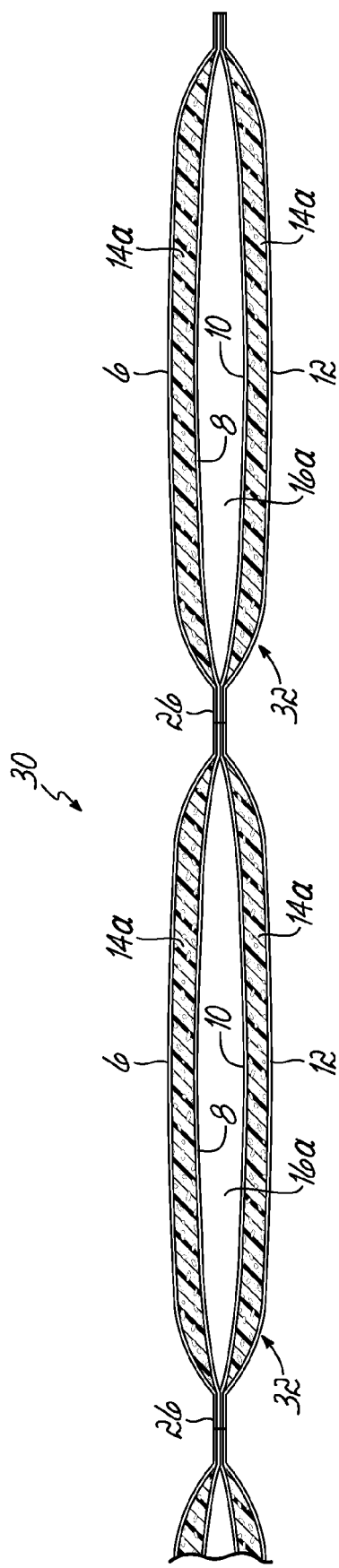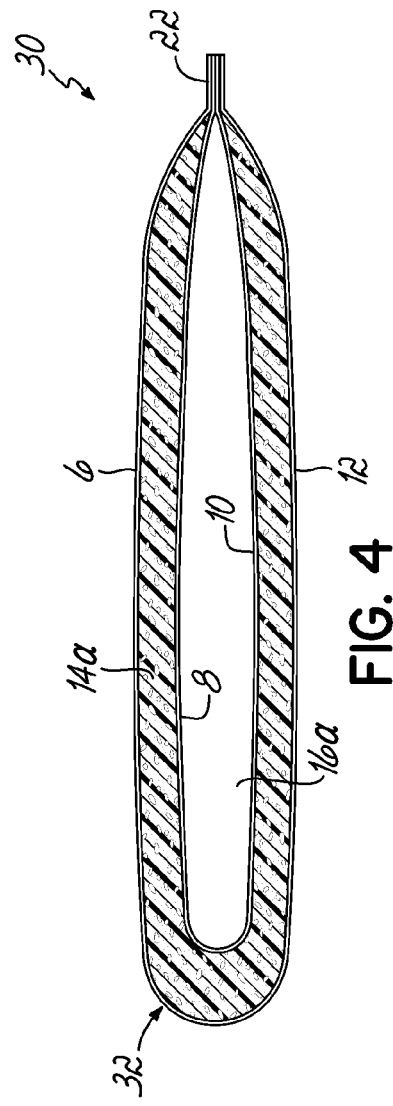
FIG. 3
FIG. 4

COMPOSITE AIR AND FOAM PROTECTIVE PACKAGING

RELATED APPLICATIONS

This application is a divisional of U.S. patent application Ser. No. 12/546,098 filed on Aug. 24, 2009, which claims priority to U.S. Provisional Patent Application Ser. No. 61/091,547 filed on Aug. 25, 2008, both of which are hereby incorporated by reference herein as if fully set forth in their entirety.

FIELD

This relates generally to protective packaging, and more particularly to a composite protective packaging product including both air and foam.

BACKGROUND

Various types of cushioning materials have heretofore been employed as protection for an item packaged for shipment. Two such types of cushioning materials are air cushions and foam cushions. An air cushion is formed from thin plastic film that is heat sealed along one or more edges to entrap air within it. An example of an air cushion is the AIRplus® air cushion, available from the assignee. A foam cushion is formed from thin plastic film that is heat sealed along one or more edges to contain expanding foam that is injected between two plies of the film. An example of a foam cushion and a machine for making it is disclosed in U.S. Pat. No. 5,727,370, hereby incorporated by reference herein as if fully set forth in its entirety.

Each of these two types of protective packaging has its own inherent advantages and disadvantages. One advantage of air cushions is that the fill material, air, has zero cost. On the other hand, the fill material of foam cushions, foam, has significant costs in its raw starting materials (two foam precursors). One advantage of foam cushions is that the freshly injected expanding foam of the cushion will mold itself to or around the item being packaged, thereby better protecting the item. On the other hand, an air cushion is unable to mold itself to or around the item being packaged. However, air cushions have greater resilience than foam cushions.

It is desirable to devise a packaging material that combines the advantages of both air cushions and foam cushions.

SUMMARY

A composite air and foam protective packaging product comprises a packaging cushion having, in cross-section, at least three plies of plastic film, foam between a first ply and a second ply of the three plies of plastic film, and air between the second ply and a third ply of the three plies of plastic film.

The packaging cushion can have, in cross-section, four plies of plastic film, foam between the first ply and the second ply of the four plies of plastic film, air between the second ply and the third ply of the four plies of plastic film, and foam between the third ply and a fourth ply of the four plies of plastic film. The packaging cushion can have a longitudinally extending heat seal along a lateral edge thereof and a transversely extending heat seal thereacross.

A machine for producing protective packaging comprises means for providing, in cross-section, at least three plies of plastic film, means for injecting a foam between a first ply and a second ply of the three plies of plastic film, and means for injecting air between the second ply and a third ply of the three plies of plastic film.

The machine can further comprise means for advancing the plies of plastic film. The machine can further comprise means for forming a longitudinally extending heat seal along a lateral edge of the plies of plastic film. The machine can further comprise means for forming a transversely extending heat seal across the plies of plastic film.

DRAWINGS

FIG. 3 is a view taken along line 3-3 in FIG. 2.

FIG. 4 is a view taken along line 4-4 in FIG. 2.

DESCRIPTION

Figure 1:
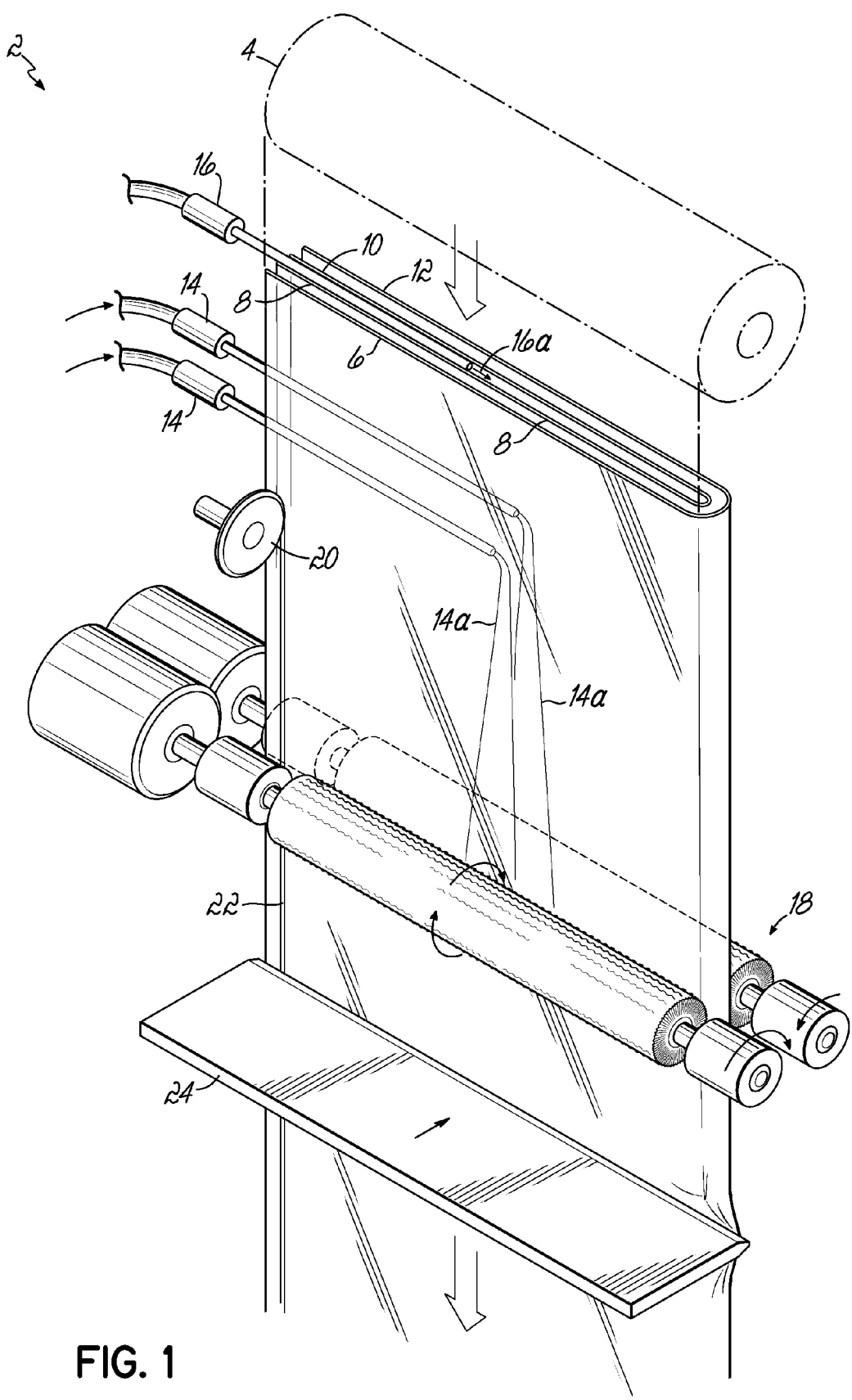
FIG. 1 is a diagrammatic perspective view of a machine for producing composite air and foam protective packaging.

Referring first to FIG. 1, a machine 2 for producing protective packaging comprises means (for example a supply roll) 4 for providing, in cross-section, at least three plies 6, 8, 10 of plastic film, means (for example nozzle, supply line, and source) 14 for injecting a foam 14a between a first ply 6 and a second ply 8 of the three plies of plastic film, and means (for example nozzle, supply line, and source) 16 for injecting air between the second ply 8 and a third ply 10 of the three plies of plastic film.

The machine 2 can further comprise means (for example a pair of counter rotating brushes and/or rollers) 18 for advancing the plies 6, 8, 10 of plastic film. The machine 2 can further comprise means (for example heat sealing roller) 20 for forming a longitudinally extending heat seal 22 along a lateral edge of the plies 6, 8, 10 of plastic film. The machine 2 can further comprise means (for example heat sealing bar) 24 for forming a transversely extending heat seal 26 across the plies 6, 8, 10 of plastic film.

Figure 2:
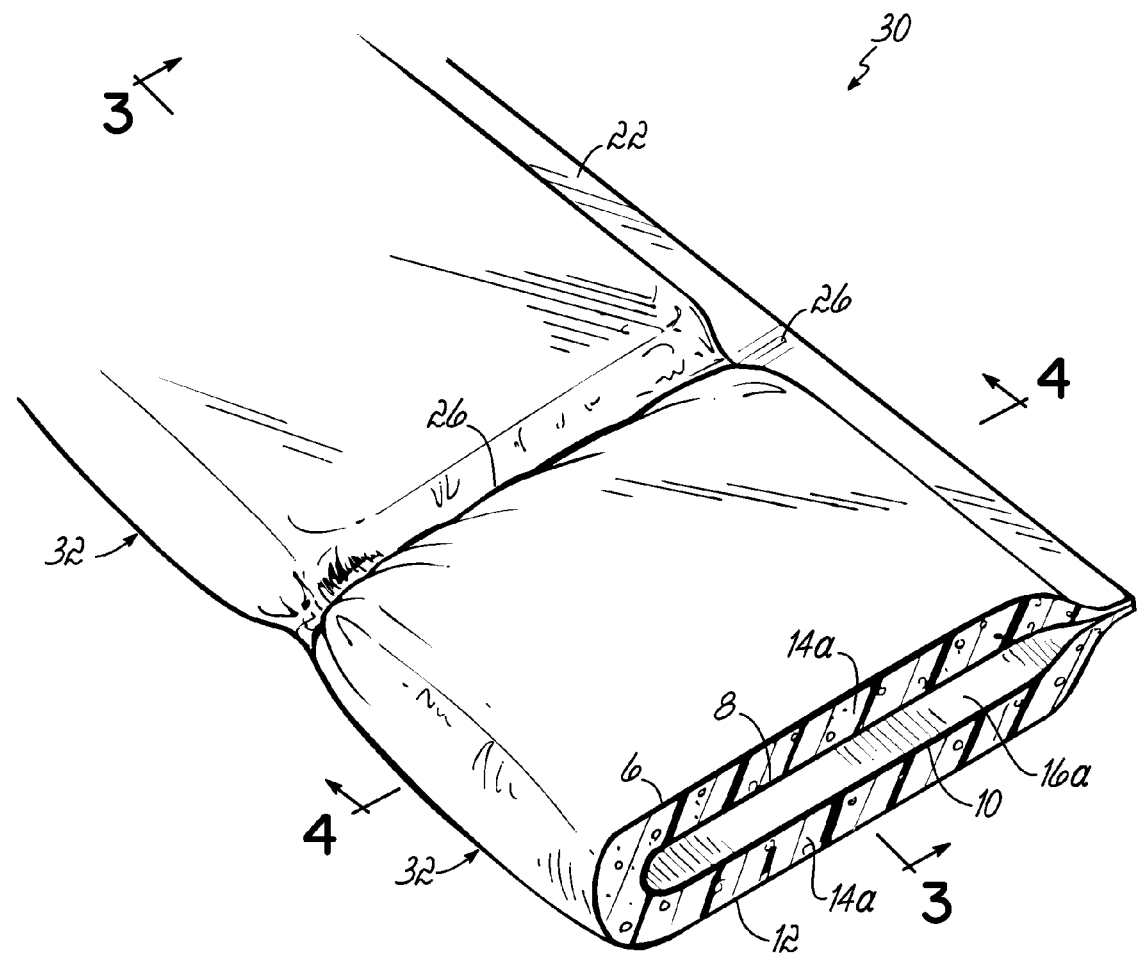
FIG. 2 is a perspective view of a packaging cushion made by the machine of FIG. 1.

Referring to FIGS. 2-4, a composite air and foam protective packaging product 30 made by the machine 2 of FIG. 1 is illustrated. The composite air and foam protective packaging product 30 comprises a packaging cushion 32 having, in cross-section, at least the three plies of plastic film 6, 8, 10, foam 14a between the first ply 6 and the second ply 8 of the three plies of plastic film, and air 16a between the second ply 8 and the third ply 10 of the three plies of plastic film.

The packaging cushion 32 can have, in cross-section, four plies 6, 8, 10, 12 of plastic film, foam 14a between the first ply 6 and the second ply 8 of the four plies of plastic film, air 16a between the second ply 8 and the third ply of 10 of the four plies of plastic film, and foam 14a between the third ply 10 and the fourth ply 12 of the four plies of plastic film. (The machine 2 can have an extra means 14 for injecting foam 14a between the third ply 10 and the fourth ply 12 of the four plies of plastic film.) The packaging cushion 32 can have a longitudinally extending heat seal 22 along a lateral edge thereof and a transversely extending heat seal 26 thereacross.

The embodiments shown and described are for illustrative purposes only. The drawings and the description are not intended to limit in any way the scope of the claims. Those skilled in the art will appreciate various changes, modifications, and alternative embodiments. All such changes, modifications and embodiments are embraced by the claims. Accordingly, the scope of the right to exclude shall be limited only by the following claims and their equivalents.

What is claimed is:

1. A machine for producing protective packaging comprising:
   means for providing, in cross-section, at least three plies of plastic film,
   means for injecting a foam between a first ply and a second ply of said at least three plies of plastic film, and
   means for injecting air between said second ply and a third ply of said at least three plies of plastic film.

2. The machine of claim 1 further comprising:
   means for advancing said plies of plastic film.

3. The machine of claim 2 further comprising:
   means for forming a longitudinally extending heat seal along a lateral edge of said plies of plastic film.

4. The machine of claim 3 further comprising:
   means for forming a transversely extending heat seal across said plies of plastic film.

5. A machine for producing a protective packaging cushion comprising:
   a supply of plastic film configured to provide, in cross-section, at least three plies of plastic film,
   a first foam injector for injecting foam between a first ply and a second ply of said at least three plies of plastic film, and
   an air injector for injecting air between said second ply and a third ply of said at least three plies of plastic film.

6. The machine of claim 5 further comprising:
   a pair of counter-rotating members for advancing said plies of plastic film, said counter-rotating members selected from the group consisting of rollers and brushes.

7. The machine of claim 6 further comprising:
   a heat sealing roller for forming a longitudinally extending heat seal along a lateral edge of said plies of plastic film.

8. The machine of claim 7 further comprising:
   a heat sealing bar for forming a transversely extending heat seal across said plies of plastic film.

9. The machine of claim 5 wherein said supply of plastic film is configured to provide, in cross-section, four plies of plastic film, and wherein said machine further comprises a second foam injector for injecting foam between said third ply and a fourth ply of said four plies of plastic film.

10. The machine of claim 9 wherein:
    said first and fourth plies of plastic film are provided by a first sheet of plastic film that has been folded in half along a longitudinal fold line, and
    said second and third plies of plastic film are provided by a second sheet of plastic film that has been folded in half along a longitudinal fold line.

11. The machine of claim 10 wherein each of said first and second sheets of plastic film has a pair of free edges, and wherein said machine further comprises:
    a heat sealing roller that forms a longitudinally extending heat seal along a lateral side edge of the packaging cushion opposite said fold lines thereby sealing said pairs of free edges together, and
    a heat sealing bar that forms a pair of transversely extending heat seals across the packaging cushion defining opposite end edges thereof thereby sealing said four plies of plastic film together.

* * * * *